(12) United States Patent
Matsuki

(10) Patent No.: US 7,332,847 B2
(45) Date of Patent: Feb. 19, 2008

(54) ELECTRET ACTUATOR

(75) Inventor: Kaoru Matsuki, Akishima (JP)

(73) Assignee: Olympus Corporation, Tokyo (JP)

( * ) Notice: Subject to any disclaimer, the term of this patent is extended or adjusted under 35 U.S.C. 154(b) by 172 days.

(21) Appl. No.: 11/169,125

(22) Filed: Jun. 28, 2005

(65) Prior Publication Data

US 2006/0006759 A1    Jan. 12, 2006

(30) Foreign Application Priority Data

Jul. 9, 2004    (JP)  ............................. 2004-203754

(51) Int. Cl.
*H02N 1/00*    (2006.01)
(52) U.S. Cl. ...................................... 310/309; 318/116
(58) Field of Classification Search ................ 310/309; 318/116
See application file for complete search history.

(56) References Cited

U.S. PATENT DOCUMENTS 3,696,258 A * 10/1972 Anderson et al. ........... 310/308
5,239,222 A *  8/1993 Higuchi et al. ............. 310/309
2006/0006759 A1 * 1/2006 Matsuki ...................... 310/309

FOREIGN PATENT DOCUMENTS

| JP | 4-112683 | * | 4/1992 |
| JP | 5-184163 | * | 7/1993 |
| JP | 11-215853 | | 8/1999 |
| JP | 11215853 | * | 9/1999 |

OTHER PUBLICATIONS

Translation of jp 05184163, "electrostatic actuator", Jul. 23, 1993, Yano et al.*
Translation of jp 04112683, "electrostatic actuator", Apr. 14, 1992, Funekubo.*

* cited by examiner

*Primary Examiner*—Tamai I Karl
(74) *Attorney, Agent, or Firm*—Scully, Scott, Murphy & Presser, P.C.

(57) ABSTRACT

An electret actuator comprising a fixed substrate having driving electrodes of a plurality of phases arranged therein, a movable element arranged on the fixed substrate and made electret in similar polarity at predetermined pitches in portions which face the driving electrodes, and a driving control section configured to generate driving voltage patterns of a plurality of phases set at stages to move the movable element relative to the fixed substrate and a floating voltage pattern of a plurality of phases to float the movable element from the fixed substrate, and to apply the voltage patterns to the driving electrodes. The floating voltage pattern output from the driving control section has voltages similar to the electret charged polarity of the movable element.

1 Claim, 6 Drawing Sheets

ELECTRET ACTUATOR

CROSS-REFERENCE TO RELATED APPLICATIONS

This application is based upon and claims the benefit of priority from prior Japanese Patent Application No. 2004-203754, filed on Jul. 9, 2004, the entire contents of which are incorporated herein by reference.

BACKGROUND OF THE INVENTION

1. Field of the Invention

The present invention relates to an electrostatic actuator which moves a movable element by an electro-static force applied between a fixed substrate and the movable element, and more particularly to an electret actuator which uses an electret for the movable element.

2. Description of the Related Art

As an actuator, an electromagnetic actuator that uses an electromagnetic force has conventionally been used frequently. Such an electromagnetic actuator is configured by using an electromagnetic coil or a permanent magnet. Thus, not only the structure becomes complex but also power consumption becomes large during driving.

On the other hand, the electrostatic actuator is not only simple in configuration but also can be driven with low consumption, and thus it is now the focus of attention as an actuator suited to miniaturization.

The electrostatic actuator conveys the movable element by the horizontal component (driving force) of an electrostatic force applied between driving electrodes installed in the fixed substrate and the movable element arranged on the fixed substrate. During the driving, the driving force is increased as the electrostatic force becomes larger. Simultaneously, however, adsorbability of bonding the movable element to the fixed substrate is increased to enlarge the friction force, consequently blocking movement of the movable element relative to the fixed substrate. Accordingly, measures must be taken to improve driving efficiency.

To solve the problem of the adsorption of the movable element, there has been proposed a conveying device disclosed in Jpn. Pat. Appln. KOKAI Publication No. 11-215853. The conveying device comprises a fixed substrate which has strip-shaped driving electrodes extended in a direction orthogonal to the conveying direction of a movable element, and the movable element which has a resistor. In this case, the every two strip-shaped driving electrodes are connected to constitute three-phase electrode sections. The electrode sections are arranged at equal pitch.

According to this conveying device, first, in an initial polarization step, an initial polarization pattern (−, +, +) is applied to the electrode sections with respect to the movable element set in an operation start position. Then, the initial polarization pattern and the movable element are subjected to electrostatic polarization, and the movable element is charged by patterns (+, −, −) reverse to the initial polarization patterns. Next, driving patterns are applied to the electrode sections in order of (+, −, 0)→(0, +, −)→(−, 0, +). Then, the movable element is moved relative to the fixed substrate by attraction and repulsion of an electrostatic force generated by the charging patterns of the movable element and the driving patterns applied to the electrode sections.

In this case, when initial polarization occurs, adsorption is applied by the initial polarization and charging patterns of each electrode section, and an operation is prevented even when the driving patterns are applied in next steps. Thus, Publication No. 11-215853 proposes a driving method of preventing adsorption by setting a separation step after the initial polarization step.

That is, according to the driving method, in a state in which the initial polarization pattern is applied to the electrode sections of the driving electrode and the charging pattern is formed in the movable element, to release bonding between the movable element and the fixed substrate, separation pattern (+, −, −) of polarities reverse to the initial polarization pattern (−, +, +) is applied to the electrode sections. As the movable element thereby floats, an operation is facilitated by subsequently applying the driving pattern to the electrode sections. Then, by inserting the separation pattern before each driving pattern, it is possible to realize stable driving of reduced adsorption.

BRIEF SUMMARY OF THE INVENTION

According to a first aspect of the present invention, there is provided an electret actuator comprising:

a fixed substrate having driving electrodes of a plurality of phases arranged therein;

a movable element arranged on the fixed substrate and made electret in similar polarity at predetermined pitch in portions which face the driving electrodes; and a driving control section configured to generate driving voltage patterns of a plurality of phases set at stages to move the movable element relative to the fixed substrate and a floating voltage pattern of a plurality of phases to float the movable element from the fixed substrate, and to apply the voltage patterns to the driving electrodes, the floating voltage pattern output from the driving control section having voltages similar to the electret charged polarity of the movable element.

According to a second aspect of the present invention, there is provided an electret actuator comprising:

fixed means having driving electrodes of a plurality of phases arranged therein;

movable means arranged on the fixed means and made electret in similar polarity at predetermined pitch in portions which face the driving electrodes; and driving control means for generating driving voltage patterns of a plurality of phases set at stages to move the movable means relative to the fixed means and a floating voltage pattern of a plurality of phases to float the movable means from the fixed means, and to apply the voltage patterns to the driving electrodes, the floating voltage pattern output from the driving control means having voltages similar to the electret charged polarity of the movable means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, the preferred embodiments of the present invention will be described with reference to the accompanying drawings.

Figure 1:
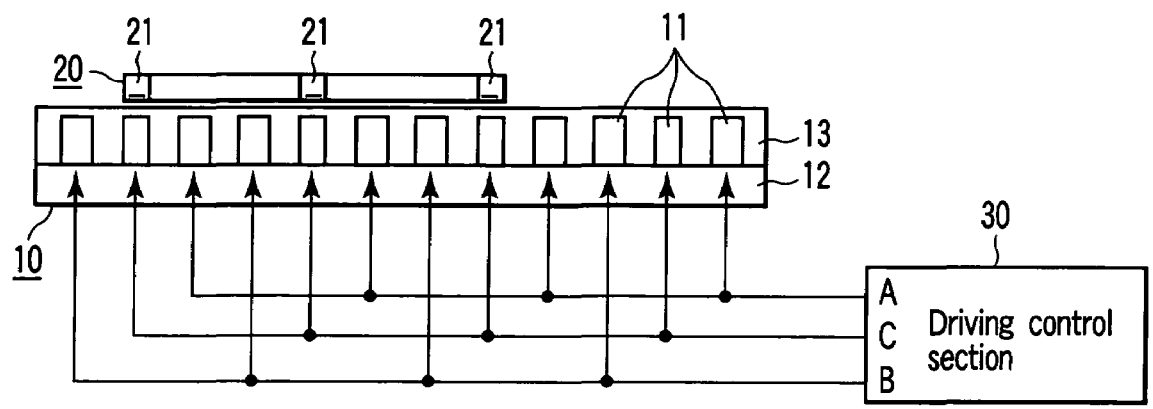
FIG. 1 is a diagram showing a configuration of an electret actuator according to a first embodiment of the present invention.

Referring to FIG. 1, an electret actuator of a first embodiment of the present invention comprises a fixed substrate 10 having a plurality of driving electrodes 11 installed therein, a movable element 20 arranged thereon, and a driving control section 30 for applying a voltage pattern to the driving electrodes 11. In this case, the driving electrodes 11 are strip-shaped electrodes arranged at equal intervals on a base material 12 to extend in a direction orthogonal to the page surface, and covered with an insulator 13. The movable element 20 is arranged on the insulator 13. The movable element 20 has areas (referred to as electret areas 21 hereinafter) subjected to electret processing (permanent charging processing) at a predetermined pitch in a surface which faces the driving electrodes 11. In FIG. 1, the movable element 20 is made electret to a negative polarity.

The driving control section 30 generates three-phase driving voltage patterns and floating voltage pattern, and applies these patterns to the driving electrodes 11. Accordingly, the every two driving electrodes 11 are connected to each other, and connected as three driving lines of phases A, B and C to the driving control section 30. The driving voltage patterns are for moving the movable element 20 relative to the fixed substrate 10 by attraction and repulsion generated between the voltage applied to each driving electrode 11 and the charged electret area 21 of the movable element 20. The floating voltage pattern is for floating the movable element 20 from the fixed substrate 10.

Figure 3:
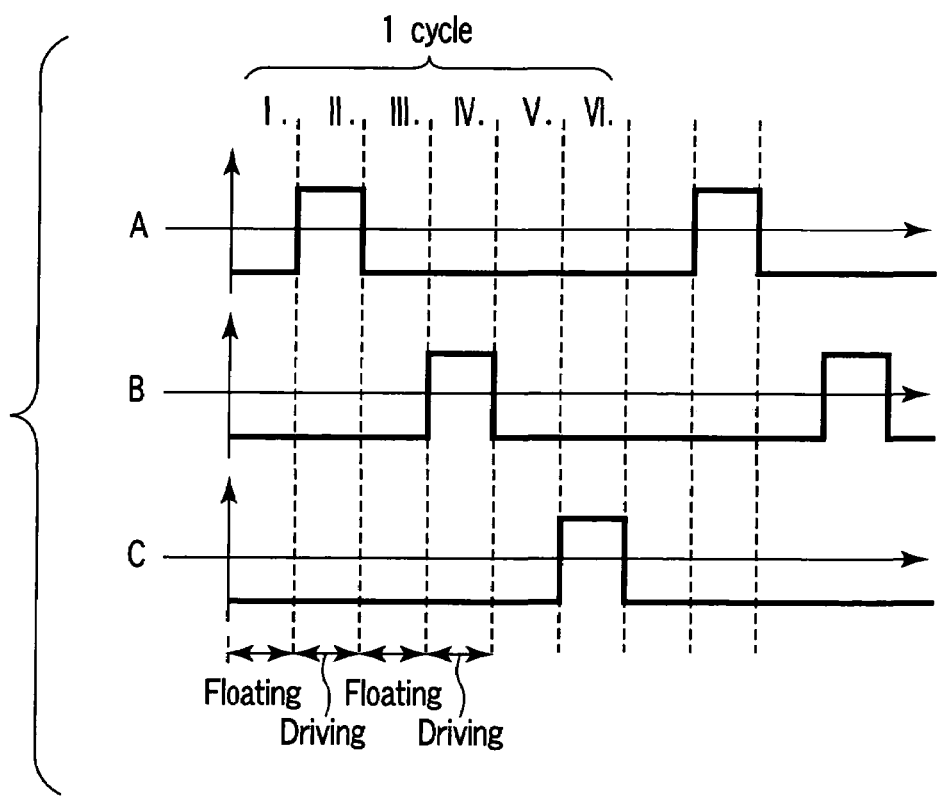
FIG. 3 is a diagram showing output waveforms of the driving control section of the electret actuator of the first embodiment.
Figure 2:
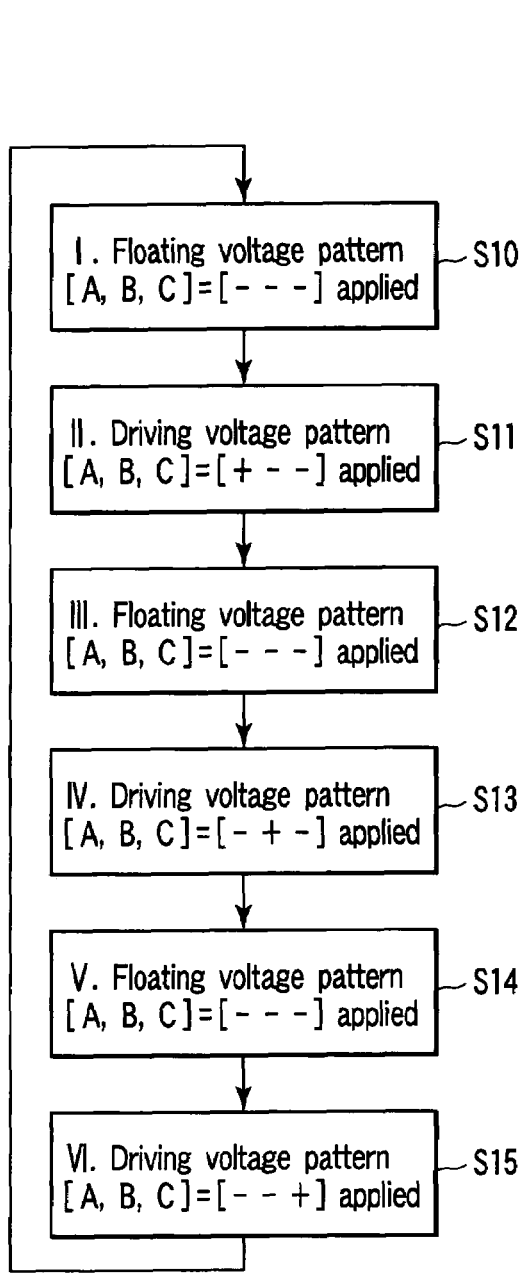
FIG. 2 is a flowchart showing the operation of a driving control section of the electret actuator of the first embodiment.
Figure 4:
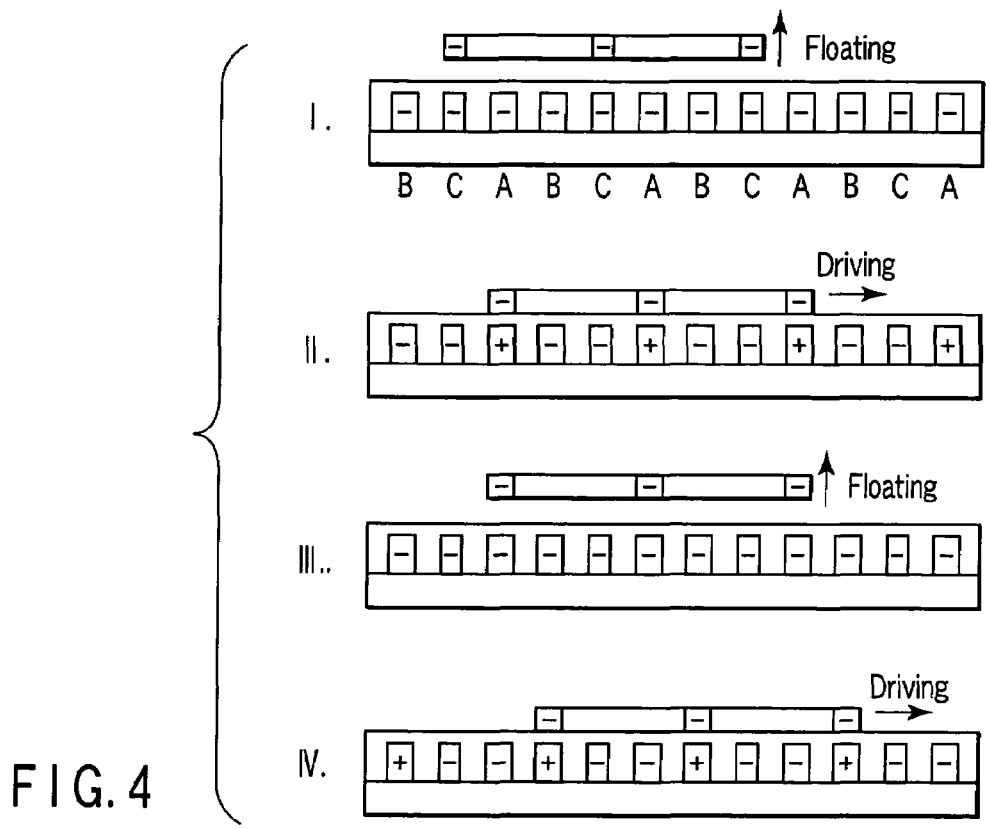
FIG. 4 is a diagram showing the state of a voltage applied to each driving electrode and a movable element of the electret actuator of the first embodiment at each stage.

Next, the operation principle of the electret actuator thus configured will be described with reference to FIGS. 2 to 4.

First, in Stage I, floating voltage pattern (−, −, −) which is all negative voltages is applied to the driving electrodes 11 (step S10). The floating voltage pattern is similar in polarity to the electret areas 21 of the movable element 20. Thus, repulsion is generated to float the movable element 20 from the fixed substrate 10. Since, as the voltages of similar polarities are applied to all the driving electrodes 11, no force is applied in a direction for adsorption on the fixed substrate 10. Accordingly, the movable element 20 can be surely floated.

After the application of the floating voltage pattern to the driving electrodes 11, this time, in Stage II, driving voltage pattern (+, −, −) for moving the movable element 20 relative to the fixed substrate 10 is applied (step S11). Thus, as the movable element 20 can move without receiving adsorption, efficient driving with no frictional force can be carried out.

Thereafter, similarly, the floating voltage pattern (−, −, −) and driving pattern (−, +, −), the floating voltage pattern (−, −, −) and driving pattern (−, −, +), and the like are alternately applied (steps S12 to S15). Accordingly, the movable element 20 repeatedly floats and moves.

Furthermore, according to the driving system, the floating voltage pattern before the application of each driving voltage pattern only needs to be always similar in polarity to the electret areas 21. In other words, the floating voltage pattern does not need to be set for each stage while the driving voltage pattern must be set for each stage. Thus, as shown in FIG. 4, it is only necessary to insert the floating voltage pattern between the driving voltage patterns applied in the stages.

As described above, according to the electret actuator of the first embodiment, a sure floating force can be obtained since the floating voltage pattern of a similar polarity is applied to the electret portions (electret areas 21). Thus, it is possible to provide a stably driven and highly reliable electret actuator.

According to the embodiment, the electret areas 21 are set to the negative polarity. Not limited to this, however, the movable element 20 may be subjected to electret processing of a positive polarity. In this case, floating voltage pattern applied to the driving electrodes 11 is for applying voltages of positive polarity similar to that of the electret area 21 to all the driving electrodes 11.

Thus, since the voltages similar in polarity to the charged electret areas are applied, according to the embodiment, the floating voltage pattern can be inserted before any of the driving voltage patterns.

Next, an electret actuator of a second embodiment of the present invention will be described. The electret actuator of this embodiment is based on four-phase driving while the electret actuator of the first embodiment is based on three-phase driving.

The electret actuator of the embodiment employs a configuration (not shown) in which every three driving electrodes 11 are connected to one another, and connected as four driving lines of phases A, B, C and D to a driving control section 30.

Figure 5:
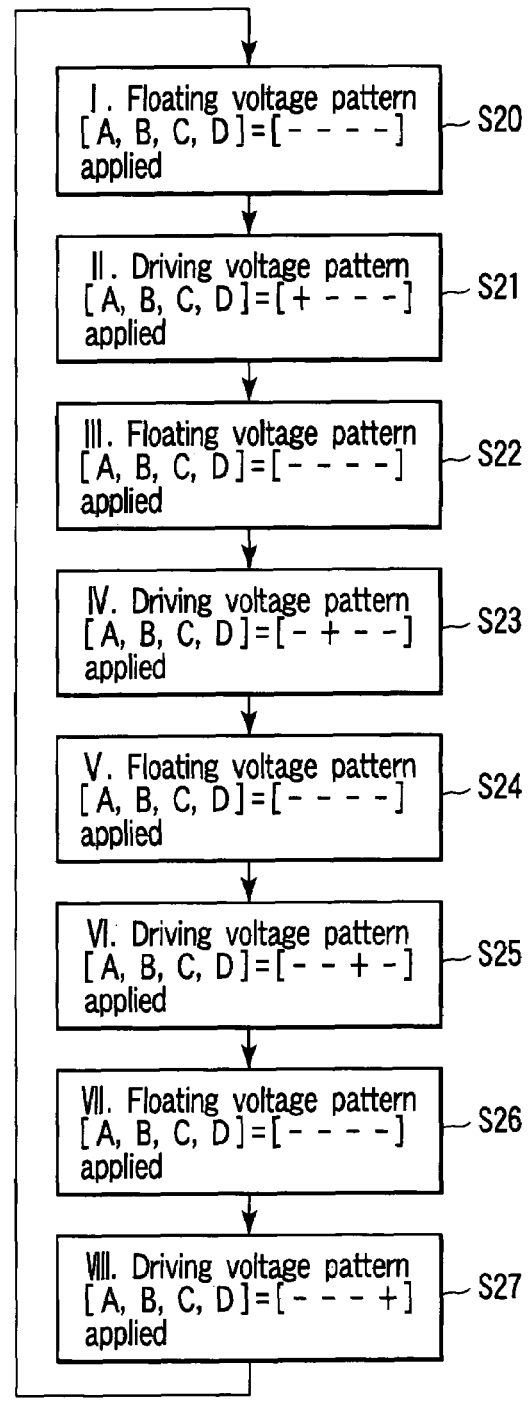
FIG. 5 is a flowchart showing the operation of a driving control section of an electret actuator according to a second embodiment of the present invention.
Figure 6:
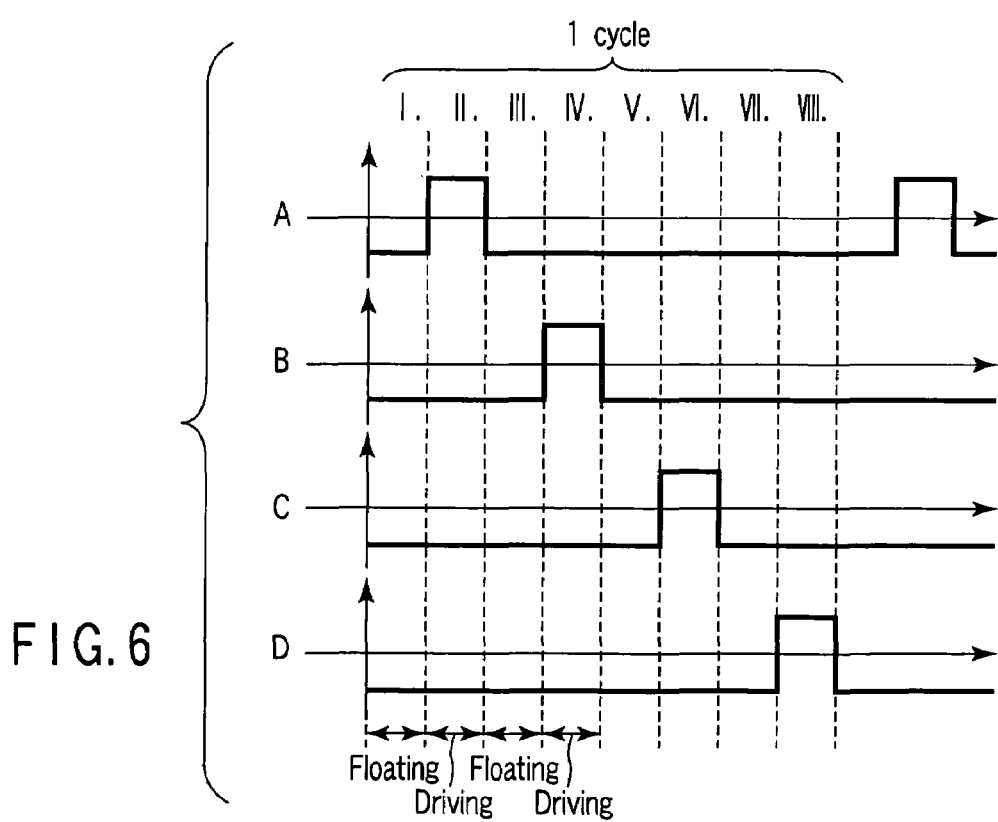
FIG. 6 is a diagram showing output waveforms of the driving control section of the electret actuator of the second embodiment.
Figure 7:
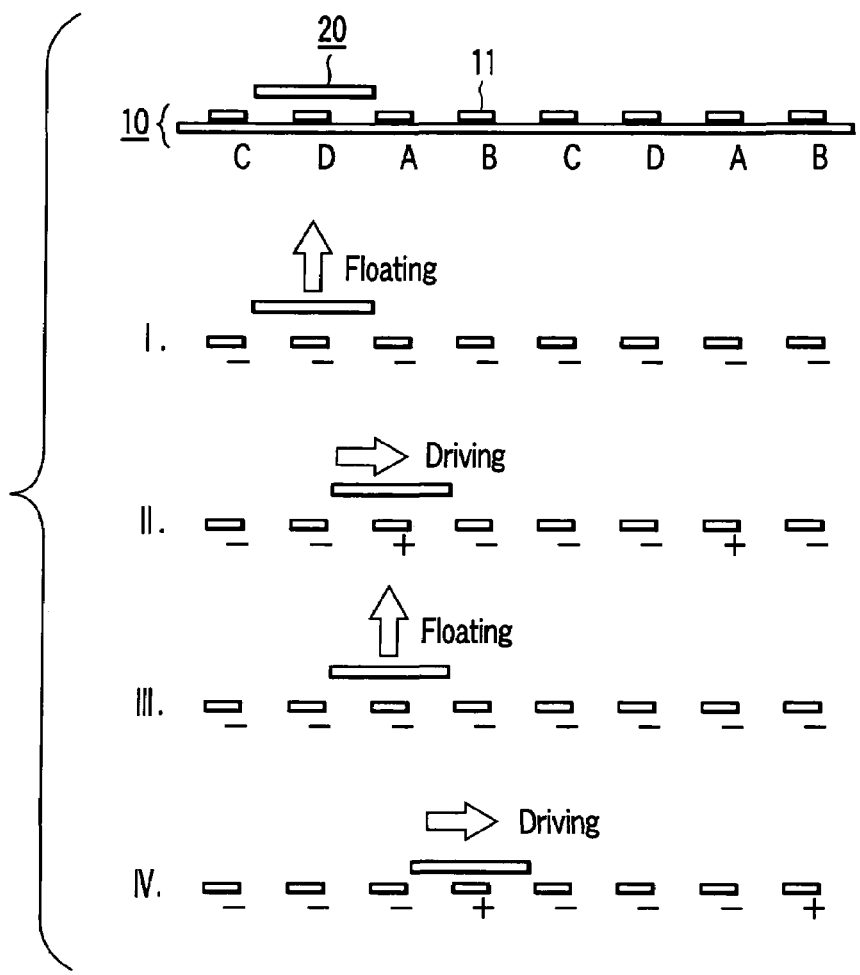
FIG. 7 is a diagram showing the state of a voltage applied to each driving electrode and a movable element of the electret actuator of the second embodiment at each stage.

In the electret actuator of the second embodiment, as shown in FIGS. 5 to 7, first, in Stage I, the driving control section 30 applies floating voltage pattern (−, −, −, −) which are all negative voltages to the driving electrodes 11 (step S20), thereby floating a movable element 20 from a fixed substrate 10. Next, in Stage II, driving voltage pattern (+, −, −, −) for moving the movable element 20 relative to the fixed substrate 10 is applied (step S21), thereby moving the movable element 20. Thereafter, similarly, the floating voltage pattern and driving voltage patterns (−, +, −, −), (−, −, +, −) and (−, −, −, +) are alternately applied (steps S22 to S27). Accordingly, the movable element 20 repeatedly floats and moves.

Thus, in the case of four-phase driving, as in the case of the driving voltage patterns of the three-phase driving of the first embodiment, only by inserting the floating voltage pattern always similar in polarity to electret areas 21 before the four-phase driving voltage patterns for moving, it is possible to provide an efficient, stably driven and highly reliable electret actuator.

Next, an electret actuator of a third embodiment of the present invention will be described. The electret actuator of this embodiment is an example of four-phase driving and two-phase excitation while the electret actuator of the second embodiment is based on four-phase driving and one-phase excitation.

Figure 8:
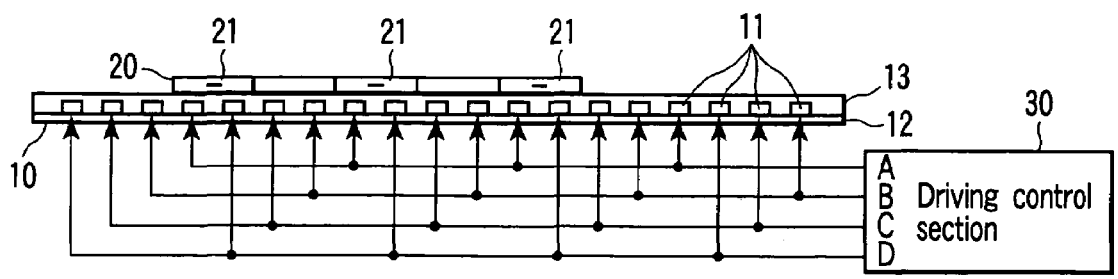
FIG. 8 is a diagram showing a configuration of an electret actuator according to a third embodiment of the present invention.

As shown in FIG. 8, in the electret actuator of the third embodiment, every three driving electrodes 11 are connected to one another, and connected as four driving lines of phases A, B, C and D to a driving control section 30. Electret areas 21 of a movable element 20 have a width to face two driving electrodes 11.

Figure 9:
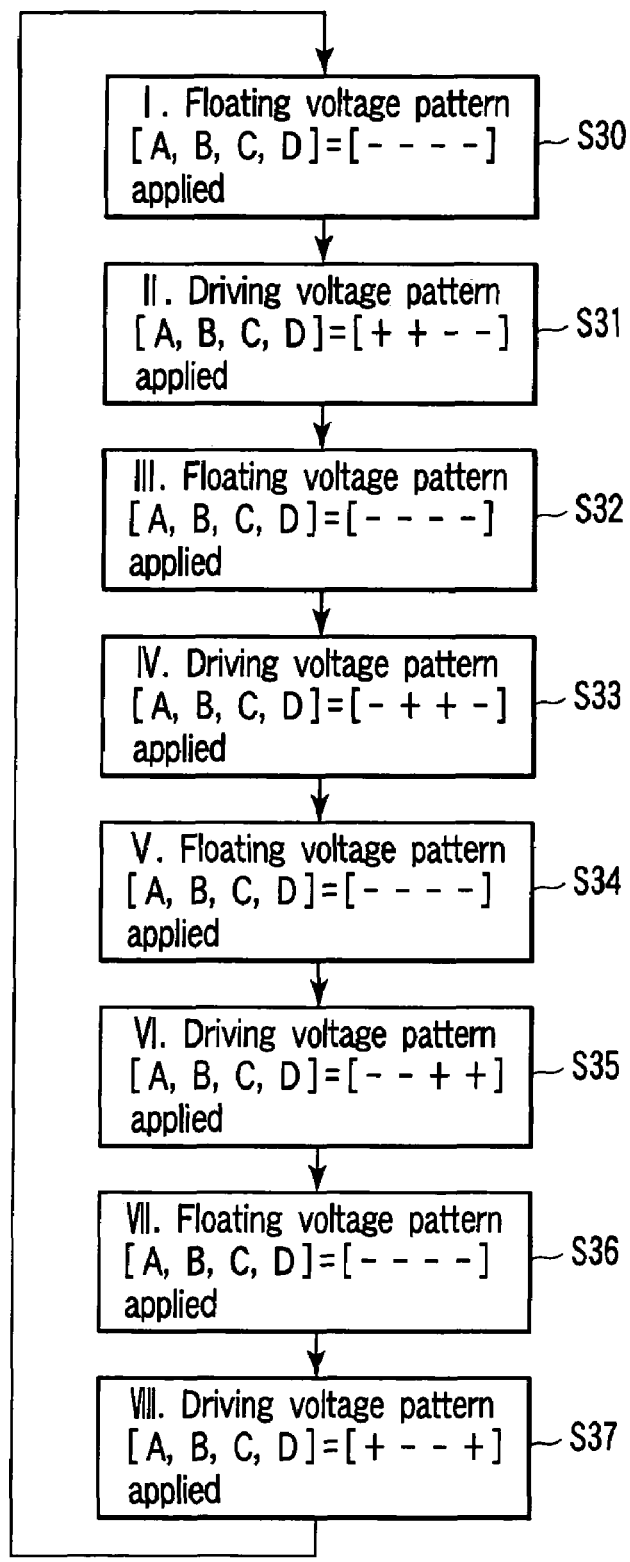
FIG. 9 is a flowchart showing the operation of a driving control section of the electret actuator of the third embodiment.
Figure 10:
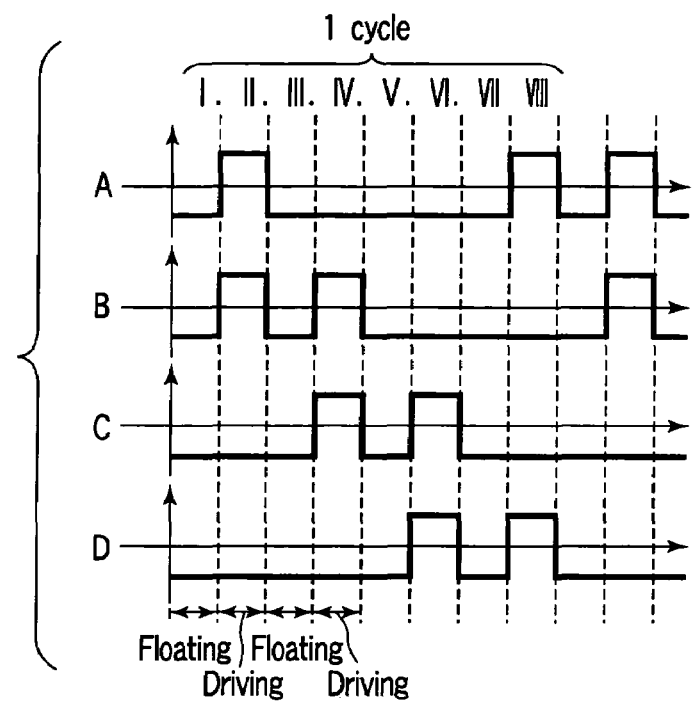
FIG. 10 is a diagram showing output waveforms of the driving control section of the electret actuator of the third embodiment.
Figure 11:
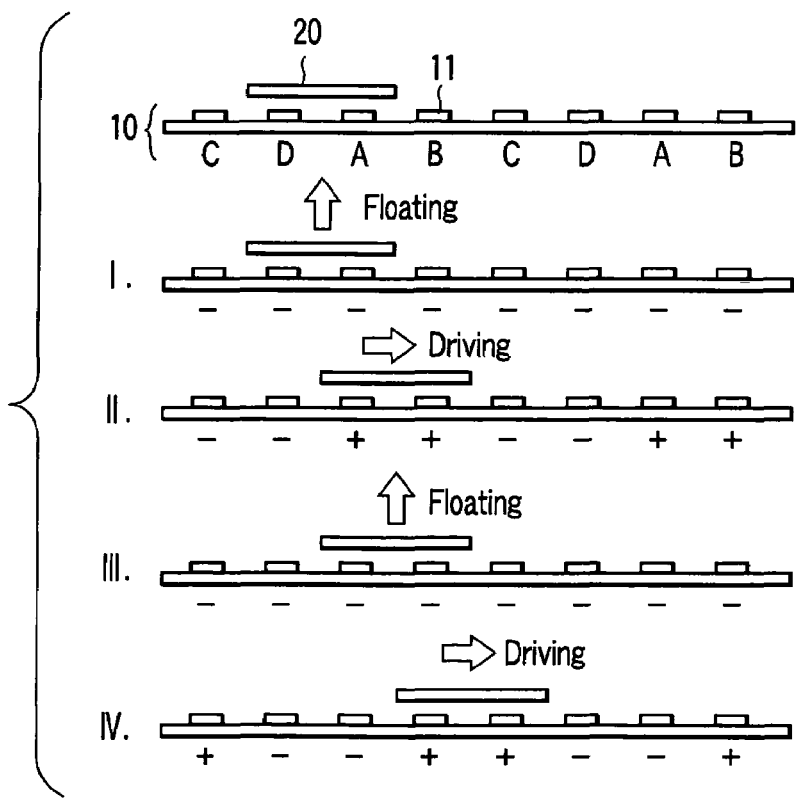
FIG. 11 is a diagram showing the state of a voltage applied to each driving electrode and a movable element of the electret actuator of the third embodiment at each stage.

In the electret actuator of the third embodiment, as shown in FIGS. 9 to 11, first, in Stage I, the driving control section 30 applies floating voltage pattern (−, −, −, −) which is all negative voltages to the driving electrodes 11 (step S30), thereby floating the movable element 20 from a fixed substrate 10. Next, in Stage II, driving voltage pattern for moving the movable element 20 relative to the fixed substrate 10 is applied (step S31), thereby moving the movable element 20. For the driving voltage pattern in this case, positive voltages and negative voltages, i.e., (−, −, +, +), are respectively applied to phases A and B and phases C and D. Accordingly, a force applied to the movable element 20 becomes larger as compared with the driving voltage pattern of the second embodiment. Thereafter, similarly, the floating voltage pattern and driving voltage patterns (−, +, +, −), (−, −, +, +) and +) are alternately applied (steps S32 to S37). Accordingly, the movable element 20 repeatedly floats and moves.

As understood from the above, according to the four-phase driving and the driving voltage patterns set in the aforementioned manner, it is possible to provide a more efficient, stably driven and highly reliable electret actuator.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for driving an electret actuator comprising a fixed substrate having driving electrodes of a plurality of phases arranged therein; a movable element arranged on the fixed substrate and made electret in similar polarity at predetermined pitch in portions which face the driving electrodes; and drive controlling means for moving the movable element relative to the fixed substrate, the method comprising:
   a floating voltage pattern applying step of applying a pattern of voltage of the same polarity as that of the movable element, which has been made electret, to the driving electrodes; and
   a driving voltage pattern applying step of applying a pattern of voltage to the plurality of phases set at stages;
   wherein the floating voltage pattern applying step is carried out before the driving voltage pattern applying step by the drive controlling means; and
   wherein the driving electrodes on the fixed substrate have four phases, the movable element has electret areas having a width to face two of the driving electrodes of the fixed substrate, and the driving voltage pattern applying step applies the pattern of voltage in two-phase excitation.

* * * * *